(12) United States Patent
Muir et al.

(10) Patent No.: US 11,113,982 B2
(45) Date of Patent: Sep. 7, 2021

(54) PROGRAMMABLE EDUCATION DEVICE

(71) Applicant: Kyle Muir, Salt Lake City, UT (US)

(72) Inventors: Kyle Muir, Salt Lake City, UT (US); Kristy Sevy, Salt Lake City, UT (US); Ron Madsen, West Valley City, UT (US)

(73) Assignee: Kyle Muir, Salt Lake City, UT (US)

( * ) Notice: Subject to any disclaimer, the term of this patent is extended or adjusted under 35 U.S.C. 154(b) by 344 days.

(21) Appl. No.: 15/707,725

(22) Filed: Sep. 18, 2017

(65) Prior Publication Data

US 2018/0082601 A1 Mar. 22, 2018

Related U.S. Application Data

(60) Provisional application No. 62/395,493, filed on Sep. 16, 2016.

(51) Int. Cl.
| | | |
|---|---|---|
| *G09B 5/06* | (2006.01) | |
| *G09B 19/22* | (2006.01) | |
| *G09B 23/22* | (2006.01) | |

(52) U.S. Cl.
CPC .............. *G09B 5/06* (2013.01); *G09B 19/22* (2013.01); *G09B 23/22* (2013.01)

(58) Field of Classification Search
CPC .......... G09B 19/00; G09B 5/02; G09B 19/22; G09B 5/06; G09B 23/22
See application file for complete search history.

(56) References Cited

U.S. PATENT DOCUMENTS

| | | | | |
|---|---|---|---|---|
| 4,304,404 A | * | 12/1981 | Pundt ................... | A63F 3/00028 434/248 |
| 5,913,683 A | * | 6/1999 | Rahmoune ............... | G09B 5/06 434/104 |
| 2015/0031961 A1 | * | 1/2015 | Freeman ............... | A61N 1/3993 600/300 |
| 2015/0104774 A1 | * | 4/2015 | Watry ...................... | G09B 5/06 434/276 |

* cited by examiner

*Primary Examiner* — Jerry-Daryl Fletcher
(74) *Attorney, Agent, or Firm* — Maschoff Brennan; Jason W. Croft

(57) ABSTRACT

A programmable device configured for education and entertainment is described. In one embodiment, the programmable device includes a circuit board with a magnetic reed switch and a plurality of light emitting diodes (LEDs), speakers, and other electronic components. In one embodiment, the magnetic reed switch is configured to activate one or more modes of the programmable device. The LEDs is configured to display a pattern of light. The speakers are configured to emit audio. In one embodiment, the programmable device includes a polymer disk with a cylindrical receptacle to connect the programmable device to the polymer disk.

9 Claims, 5 Drawing Sheets

PROGRAMMABLE EDUCATION DEVICE

RELATED APPLICATIONS

This application claims priority to U.S. Provisional Patent Application Ser. No. 62/395,493 filed on 16 Sep. 2016 and titled "Computer Programmable Education Device." U.S. Provisional Patent Application Ser. No. 62/395,493 is incorporated by reference for all that it discloses.

BACKGROUND

The use of computer systems and computer-related technologies continues to increase at a rapid pace. This increased use of computer systems has influenced the advances made to computer-related technologies. Computer systems have increasingly become an integral part of the business world and the activities of individual consumers. Computer systems may be used to carry out several business, industry, and academic endeavors.

The wide-spread use of computers and mobile devices has caused an increased need of computer-related education. Accordingly, benefits may be realized by improving the techniques in teaching technology and computer-related subjects.

SUMMARY

According to at least one embodiment, a programmable device configured for education and entertainment is described. The programmable device may include a circuit board with a magnetic reed switch and a plurality of light emitting diodes (LEDs). The magnetic reed switch may be configured to activate one or more modes of the programmable device. The LEDs may be configured to display a pattern of light. The programmable device may include a polymer disk with a cylindrical receptacle to connect the programmable device to the polymer disk.

In some embodiments, the polymer disk may be configured to enable a game mode of the programmable device. In some embodiments, the LEDs may be programmable by a user to display a user-defined pattern of light. In one embodiment, the programmable device may include one or more buttons. In some cases, pressing a pre-determined sequence of the one or more buttons may enable one or more modes of the programmable device. In some cases, the programmable device may include at least a game mode and a programming mode.

In one embodiment, the LEDs may be configured to interact with a pair of diffraction glasses. In some cases, the diffraction glasses include information that is embedded in the glasses themselves, and the diffraction glasses may be configured to reveal that information when the light emitted by the LEDs is transmitted through the diffraction glasses. Thus, the information embedded in the glasses may be configured to be viewable in conjunction with the patterns of light from the LEDs. In some cases, the diffraction glasses have multiple images embedded in the lenses that are viewable to the user based on a sequence of light patterns emitted by the LEDs.

In some embodiments, the magnetic reed switch may be configured to interact with a remote device, such as a wand. In some cases, the wand may be configured to enable one or more modes of the programmable device by waving the wand over the magnetic reed switch. In some embodiments, the wand may include a magnet or wireless transmitter to signal the wand's presence over the magnetic reed switch. In other examples, the remote device may interact with the reed switch, but other examples, the remote device may interact with other components of the programmable device.

In one example, the wand includes an electromagnetic coil at a location where a permanent magnet may be conventionally placed. A small microcontroller may be placed behind the electromagnetic coil and a coin cell battery also incorporated into the wand. The microcontroller may turn the electromagnetic coil on and off, thereby conveying a pulsatile code to one of the magnetic reed switches and thereby to the programmable device's microcontroller.

In some embodiments, the programmable device may be configured to establish a connection between the programmable device and a user interface of a computing device. In some embodiments, the connection may include a wired connection or a wireless connection. In some embodiments, the connection may enable a user to program the programmable device via the user interface.

In some embodiments, the programmable device may include a musical encoder, the musical encoder may be configured to encrypt data via one or more audible tones and to decrypt the data via a repetition of the one or more audible tones.

In one embodiment, a programmable device configured for education and entertainment is described. The programmable device includes a circuit board with a magnetic reed switch and a plurality of output devices, the magnetic reed switch being configured to activate one or more modes of the programmable device, the output devices configured to interact with a user. The programmable device may include a disk with a cylindrical receptacle to connect the circuit board to the disk.

In some embodiments, the disk may be configured to enable a game mode of the programmable device. In further embodiments, the disk may be configured to enable an intended mode of the programmable device. In some embodiments, the output device may include at least LEDs, the LEDs may be programmable by a user to display a user-defined pattern of light. In some embodiments, the disk may be configured to enable a third party platform on the programmable device. In further embodiments, the output device may include at least one of an audio device, the disk may enable a music generating mode of the programmable device.

In further embodiments, an education and entertainment device system is described. The system includes a programmable device including a circuit board with a magnetic reed switch and a plurality of output devices, the magnetic reed switch being configured to activate one or more modes of the programmable device, the output devices configured to interact with a user. The system further includes a disk with a cylindrical receptacle to connect the circuit board to the disk. The system also includes a wand, the wand being configured to enable one or more modes of the programmable device by waving the wand over the magnetic reed switch, the wand comprising a magnet or wireless transmitter to signal the wand's presence over the magnetic reed switch.

In some embodiments, the output devices may include at least visual output device. The device may further include a pair of diffraction glasses, the diffraction glasses being configured to reveal patterns emitted by the visual output device.

In some embodiments, the output devices may include at least an audio output device. The programmable device may include a musical encoder, the musical encoder being configured to encrypt data via one or more audible tones and to decrypt the data via a repetition of the one or more audible tones. In some embodiments, the programmable device further includes one or more buttons, pressing a predetermined sequence of the one or more buttons enabling one or more modes of the programmable device, the programmable device including at least a game mode and a programming mode.

In some embodiments, the programmable device is configured to establish a connection with a user interface of a computing device, wherein the connection enables a user to program the programmable device via the connection.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
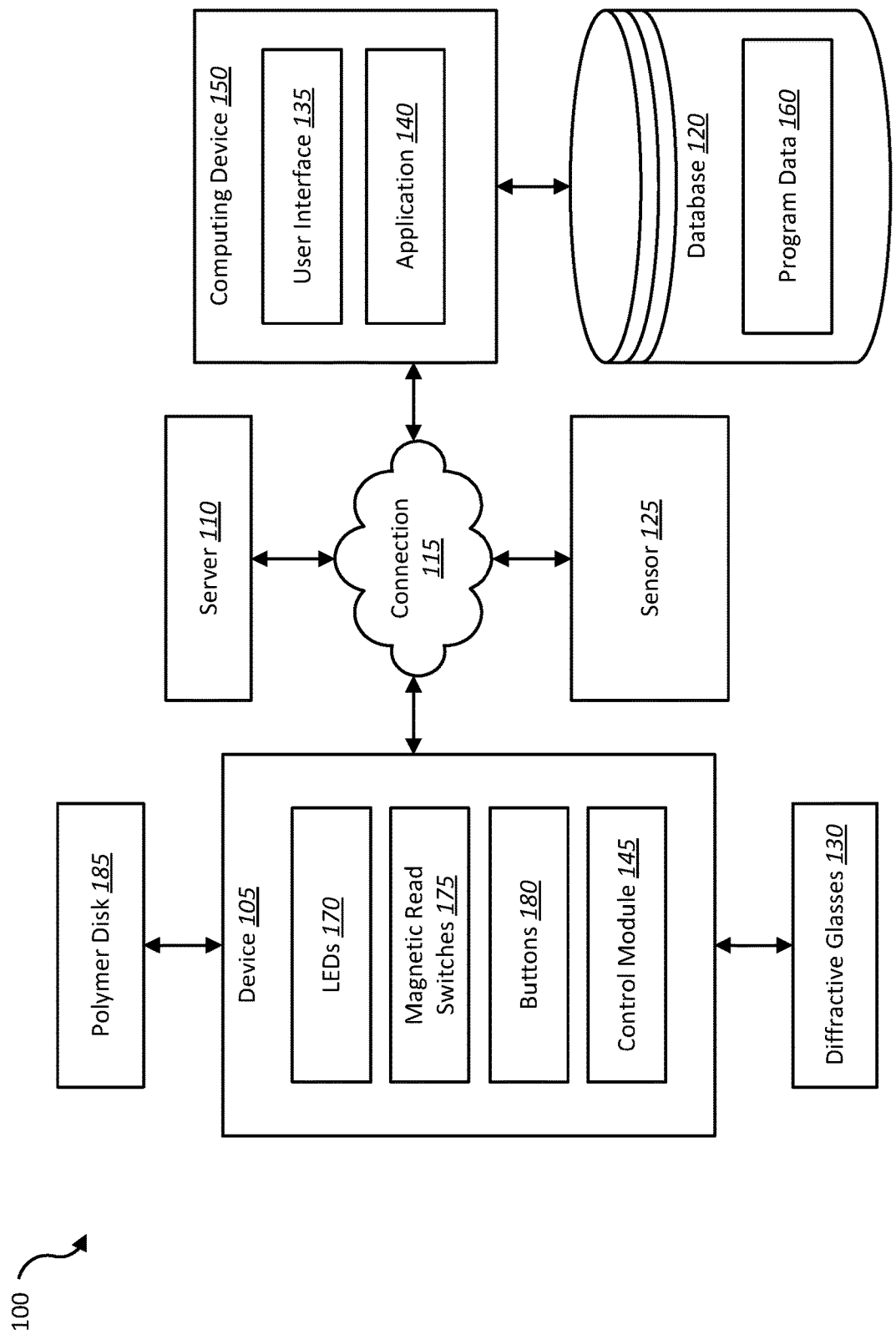
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to programmable education devices. More specifically, the systems and methods described herein relate to a device configured to educate a user regarding computer programming and use of technology via one or more programmable modes and entertain the user with one or more game modes.

FIG. 1 is a block diagram illustrating one embodiment of an environment 100 in which the present systems and methods may be implemented. In some embodiments, the systems and methods described herein may be performed on a device (e.g., device 105). As depicted, the environment 100 may include a device 105, a sensor 125, a pair of diffraction glasses 130, a polymer disk 185, a computing device 150, and a connection 115 that allows the device 105, the computing device 150, and sensor 125 to communicate with one another. In some cases, the information embedded in the diffraction glasses 130 is only viewable with the light emitted by LEDs 170 that would not otherwise be viewable without the patterns of light from the LEDs. In other cases, illumination from the LEDs 170 may reveal patterns etched into lenses associated with the diffraction glasses 130. In some cases, device 105 may be connected to polymer disk 185. In some embodiments, connecting device 105 to polymer disk 185 may include inserting device 105 in polymer disk 185. In some embodiments, connecting device 105 to polymer disk 185 may enable a game mode of device 105. In some embodiments, device 105 may include an operating system and one or more processors, computer memory devices, data storage devices, etc., for storing and executing computer executable instructions and/or one or more programs.

Examples of the device 105 may include any combination of mobile devices, smart phones, personal computing devices, computers, laptops, desktops, servers, media content set top boxes, digital video recorders (DVRs), or any combination thereof. In some cases, device 105 may include a building automation controller integrated within device 105, or as depicted, may be in communication with an automation controller via connection 115. Examples of computing device 150 may include any combination of a mobile computing device, a laptop, a desktop, a server, a media set top box, a data server, a cloud server, a server associated with an automation service provider, proxy server, mail server, web server, application server, database server, communications server, file server, home server, mobile server, name server, or any combination thereof.

In some configurations, the device 105 may include one or more light emitting diodes (LEDs) 170, one or more magnetic reed switches 175, one or more buttons 180, and control module 145. The LEDs 170 may comprise a multi-color light emitting diode. In some embodiments, the device may include a PC Board, a microcontroller, a transducer (for example, an audio piezo transducer), a photocell, reed switches, tactile switch buttons, and/or an user interface such as an on/off switch. Although the components of the device 105 are depicted as being internal to the device 105, it is understood that one or more of the components may be external to the device 105 and connect to device 105 through wired and/or wireless connections. In some embodiments, control module 145 may be installed on computing device 150 in order to allow a user to interface with a function of device 105 via computing device 150.

Examples of sensor 125 may include any combination of a magnetic sensor, proximity sensor, boundary sensor, light beam sensor, motion sensor, accelerometer, global positioning system (GPS) sensor, Wi-Fi positioning system sensor, capacitance sensor, radio frequency sensor, near-field sensor, temperature sensor, movement sensor, voice sensor, other types of sensors, actuators, or combinations thereof. Sensor 125 may represent one or more separate sensors or a combination of two or more sensors in a single device. In some cases, sensor 125 may be configured in a wand device configured to interact with device 105. For example, sensor 125 may enable one or more modes of device 105 in conjunction with moving sensor 125 in relation to the magnetic reed switches 175 of device 105. In some cases, one or more modes of device 105 may be enabled in relation to pressing the one or more buttons 180. For example, a pressing of a predetermined combination or sequence of the one or more buttons 180 may enable a game mode. Although sensor 125 is depicted as connecting to device 105 over connection 115, in some embodiments, sensor 125 may connect directly to or within device 105.

In some embodiments, device 105 may communicate with server 110 via connection 115. Examples of connection 115 may include any combination of wired and wireless connections such as universal serial bus (USB) cable connections, copper RJ45 connections, cloud networks, local area networks (LAN), wide area networks (WAN), virtual private networks (VPN), wireless networks (using 802.11, for example), cellular networks (using 3G and/or LTE, for example), etc. In some configurations, the connection 115 may include the Internet. It is noted that in some embodiments, the device 105 may not include a control module 145. For example, device 105 may include application 140 that allows device 105 to interface with computing device 150 via control module 145 located on device 105 and/or another device such as computing device 150. In some embodiments, device 105 and server 110 may include a control module 145 where at least a portion of the functions of control module 145 are performed separately and/or concurrently on device 105, and/or server 110. Likewise, in some embodiments, a user may access the functions of device 105 and/or computing device 150 (directly or through device 105 via control module 145). For example, in some embodiments, computing device 150 includes a mobile application that interfaces with one or more functions of device 105 and/or control module 145.

In some embodiments, server 110 may be coupled to database 120. Database 120 may be internal or external to the server 110. In one example, device 105 may be coupled directly to database 120, database 120 being internal or external to device 105. Database 120 may include program data 160. For example, device 105 may access program data 160 in database 120 over connection 115 via server 110. Program data 160 may include data regarding programming device 105. For example, a user may write and/or modify one or more programs configured to control an aspect of device 105 such as a program to cause LEDs 170 to display a pattern of light. Such a program may be stored in program data 160 in database 120. In some examples, the program data may represent instructions that can cause a processor to simulate, suggest, implement, and/or execute a string of data premised off of pre-existing, existing or real time user or programmable device inputs. This may complete, enhance, or add to the user generated programs. This program data may be used in an education tool, a risk mitigation tactic, or a predictive design mechanism. In some cases, the data may be inputted by a human or artificially derived.

Control module 145 may enable a user to interact and/or program device 105. In some embodiments, control module 145 may be configured to perform the systems and methods described herein in conjunction with user interface 135 and application 140. User interface 135 may enable a user to interact with, control, and/or program one or more functions of device 105. Further details regarding the control module 145 are discussed below.

Figure 2:
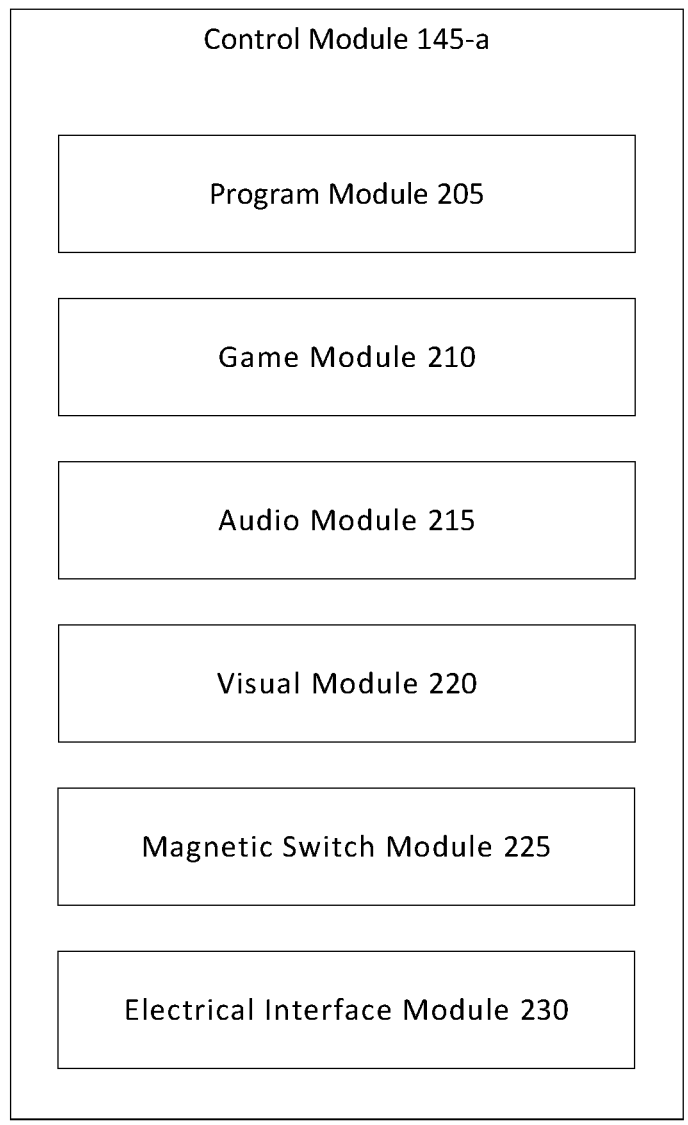
FIG. 2 is a block diagram illustrating one example of a control module.

FIG. 2 is a block diagram illustrating one example of a control module 145-*a*. Control module 145-*a* may be one example of control module 145 depicted in FIG. 1. As depicted, control module 145-*a* may include program module 205, game module 210, audio module 215, visual module 220, magnetic switch module 225, and an electrical interface module 230.

In one embodiment, program module 205 may enable a user to program a device such as device 105 of FIG. 1. In some embodiments, game module 210 may enable a user to play one or more games on a device such as device 105. In some embodiments, audio module 215 may enable a user to play a sound, create a sound, and/or store a sound on a device such as device 105. In some cases, audio module 215 may include one or more microphones and/or one or more speakers. In some cases, the audio module 215 may include a piezo speaker capable of producing multiple octaves of a tone such as a 7 octave piezo speaker. The audio module 215 may also be capable of communicating through wired or wireless programmable devices.

In some embodiments, the visual module 220 may cause one or more LEDs (such as LEDs 170) to display a pattern of light. The pattern of light may consist of various illumination patterns. The pattern of light may additionally or alternatively include producing various colored lights at varying intensity levels. In some embodiments, the program module 205 may trigger the LEDs to convey a pulsatile stream of information and/or encode information into colored sequences. In response, the diffraction glasses may be sensitive to color. For, example in some embodiments, the diffraction glasses may respond to specific colors.

In some embodiments, the magnetic switch module 225 may activate or deactivate a switch to interact with various components. For example, the magnetic switch module 225 may be programmed to pulse or convey pulsatile code to various switches to interact with external devices. For example, a wand, remote or other device may interact with a switch proximate the device 105. The wand may be programmed to interact or perform certain functions when the switch is activated. In other embodiments, the device 105 may perform predetermined actions upon detection of the wand. In some embodiments, the magnetic switch module 225 may communicate with the other modules to perform predetermined actions. For example, the magnetic switch module 225, upon detection of a wand, may cause program module 205, game module 210, audio module 215, visual module 220 or the like to take predetermined actions.

The electrical interface module 230 may enable the device to interact with an external computing device to program the device 105. For example, a user may be able to write code, download software, or the like on an external computing device. the electrical interface module 230 may interact and receive external data and communicate with the other modules to effectuate the code, programming, software, or the like.

In some embodiments, the modules of control module 145-*a* may perform one or more functions in conjunction with device 105, a circuit board, one or more magnetic reed switches (such as magnetic reed switches 175), one or more LEDs (such as LEDs 170), a polymer disk (such as polymer disk 185), and a pair of diffraction glasses (such as diffraction glasses 130).

In one embodiment, control module 145-*a* may activate one or more modes of the programmable device such as a game mode, a program mode, or any combination thereof. In one embodiment, game module 210 may be configured to enable a game mode and program module 205 may be configured to enable a program mode of a device such as device 105.

In one embodiment, game module 210 may enable a game mode or play mode in conjunction with inserting a programmable device into a circular receptacle of a polymer disk. Game module 210 may enable a user to play and interact with the programmable device such as playing a hot potato game where the device inserted in the polymer disk is passed among multiple users until a buzzing sound is produced by the device to indicate the user holding the device is caught holding the "hot potato." In some cases, game module 210, in conjunction with visual module 220, may enable a user to play a copycat game where the user presses a button in an order shown by multiple LEDs. For example, light may be emitted from the LEDs in a predetermined sequence such as a first LED emitting a light followed by a second LED, followed by a third LED, followed by the first LED again, followed by the second LED, followed by the third LED, followed by a fourth LED, and so on. A button may be associated with each LED, thus, the user may have to press the buttons in the order shown by the LEDs to continue playing and when the user makes a mistake and/or is too slow in responding the game may end. The sequence of LED illumination may change from play to play. In some embodiments, each LED may have an associated color. In some embodiments, the copycat game may require the user to remember location and color of the LED. In some cases, game module 210 may enable a user to play a memory game where the user watches a sequence of LEDs turning on/off and then press the corresponding buttons in the sequence shown to continue playing.

In some embodiments, program module 205 may enable a user to program device 105 to display a user-defined pattern of light from LEDs 170. Program module 205 may enable a user to program the LEDs to turn on/off, program the LEDs to show a pattern, color, or shape, program the LEDs to show a pattern, color, or shape viewable while a user wears diffraction glasses 130, program the LEDs to turn on/off in a pattern or sequence. In some cases, program module 205 may enable a user to learn how to make an LED of device 105 blink and interact with other electronics. For example, program module 205 may enable a user to connect to a website with instructions how to program device 105. In yet other examples, the program module 205 may be used to control an independent programmable device or an interface to an independent programmable device.

In some embodiments, program module 205 may enable a user to enter a program mode and/or game mode in conjunction with detecting one or more buttons being pressed such as buttons 180. In some cases, program module 205 may detect a user pressing a predetermined sequence of the one or more buttons enabling one or more modes of device 105.

In some embodiments, program module 205 may enable a user to enter a program mode and/or a game mode in conjunction with one or more magnetic reed switches (e.g., magnetic reed switches 175) and/or one or more sensors (e.g., sensor 125). In some embodiments, program module 205 may detect a wand. In some cases, program module 205 detecting the wand may enable one or more modes of device 105 by detecting the wand being waved over the magnetic reed switch. In some cases, the wand may include one or more magnets and/or wireless transmitter to signal the wand's presence over the magnetic reed switch.

In some embodiments, program module 205 may establish a connection between device 105 and a user interface of a computing device. (e.g., user interface 135) In some cases, the connection may include a wired connection and/or a wireless connection. The connection established and maintained by program module 205 may enable a user to program device 105 via the user interface. In some cases, a programming mode may be enabled when device 105 is separated from polymer disk 185. In some cases device 105 may be programmable while still inserted in or connected to the polymer disk 185.

In some embodiments, program module 205 may enable the device 105 to function as one of a light game, memory game, educational game, physical play game, telecommunication module, robot control, sensory control, music generator, and the like. In some embodiments, the program module 205 may enable the device 105 to connect to other devices. The other devices may comprise multiple devices 105 or may be third party devices. The program module 205 may enable device 105 to control a separate device or interact as a user interface of a separate computing device.

In some embodiments, audio module 215 may perform one or more functions in conjunction with a musical encoder. In some cases, audio module 215 in conjunction with the musical encoder may be configured to encrypt data via detection of one or more recognizable and/or non-recognizable audible tones such as tones play on a piano, etc. In some cases, audio module 215 in conjunction with the musical encoder may be configured to decrypt the data via a repetition of the one or more audible tones. In further embodiments, the audio module 215 may telecommunicate with other wired or wireless programmable devices.

While the illustrated example depicts various modules incorporated into the control module 145-*a*, more or less modules may be incorporated into the control module in accordance with the principles of the present disclosure. For example additional modules that enable additional functionality may be incorporated into the control module. Further, some of the modules depicted in the example of FIG. 2 may be absent in some embodiments.

Figure 3:
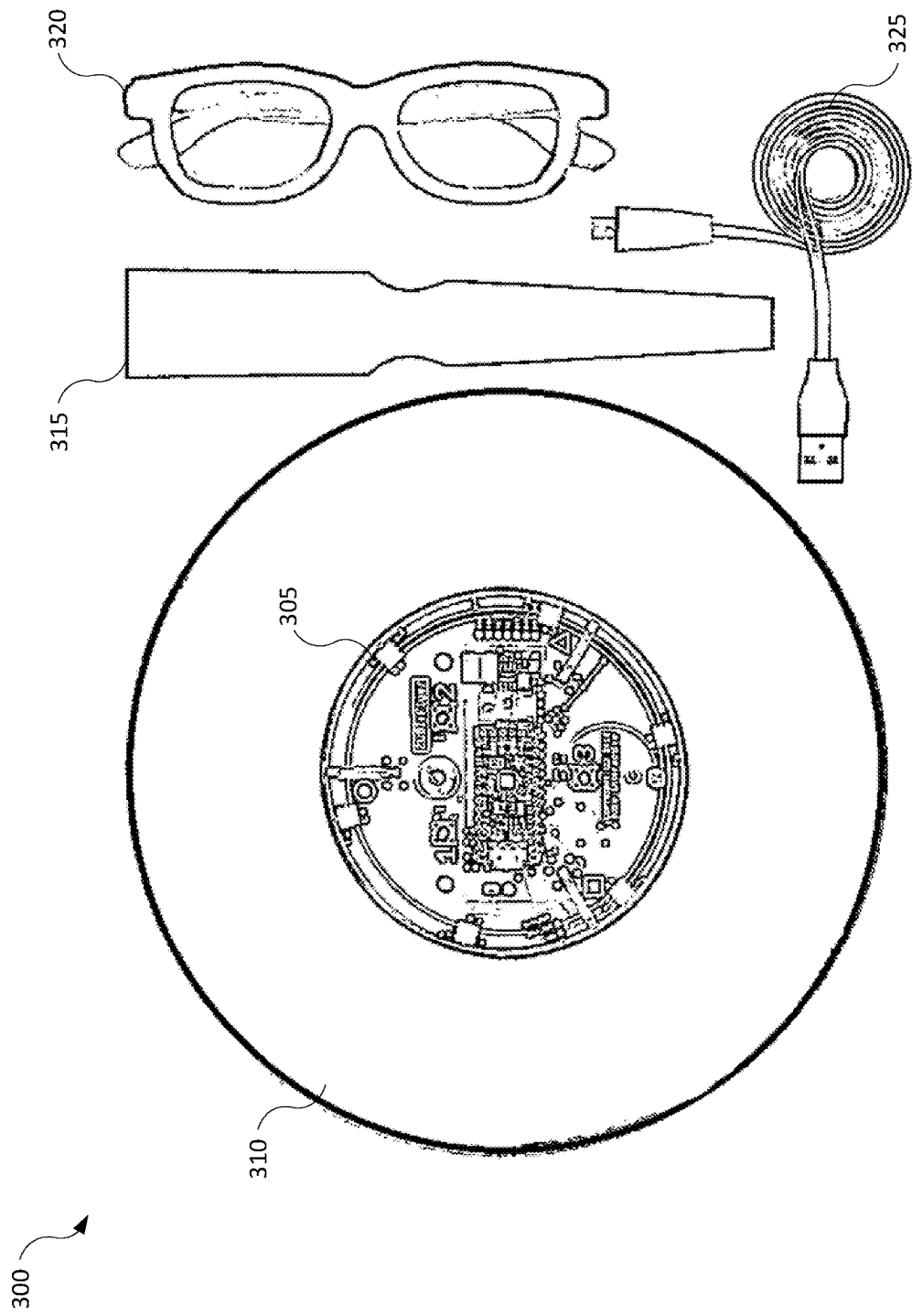
FIG. 3 is a block diagram illustrating one example of an environment for a programmable education device.

FIG. 3 is a block diagram illustrating one example of an environment 300 for a programmable education device. As depicted, environment 300 includes a programmable device 305, a polymer disk 310, a wand 315, a pair of diffraction glasses 320, and a connection cable 325. One example of programmable device 305 may include device 105 of FIG. 1. As shown, programmable device 305 may be inserted in polymer disk 310. In some examples, the polymer disk 310 is a frisbee. In some cases, the disk is made of a material other than a polymer. For example, other suitable types of materials may include, but are not limited to, cloth, nylon, metals, wood, other types of materials, or combinations thereof.

In some embodiments, programmable device 305 may detect wand 315 being waved over programmable device 305. For example, magnetic reed switches on programmable device 305 may detect wand 315 being waved over programmable device 305. In other embodiments, magnetic induction components may detect the wand 315. In other embodiments, the wand 315 may be detectable by the programmable device 305 to include capacitive coupling, near-field transmission, or infrared detection.

In some cases, programmable device 305 may emit a pattern of light viewable by diffraction glasses 320. In some cases, programmable device 305 may play one or more games when inserted in polymer disk 310. In some embodiments, programmable device 305 may be removed from polymer disk 310. When removed from polymer disk 310, programmable device 305 may enter a program mode. In some embodiments, connection cable 325 may connect programmable device 305 to a computer. A user interface on the computer may enable a user to program one or more features into programmable device 305. For example, a user may program LEDs on programmable device 305 to emit a pattern of light viewable by diffraction glasses 320. In some cases, the user may program a game into programmable device 305 via the user interface. The some cases, the user may program any appropriate interactive web of telecommunicative hardware in the physical world.

Figure 4:
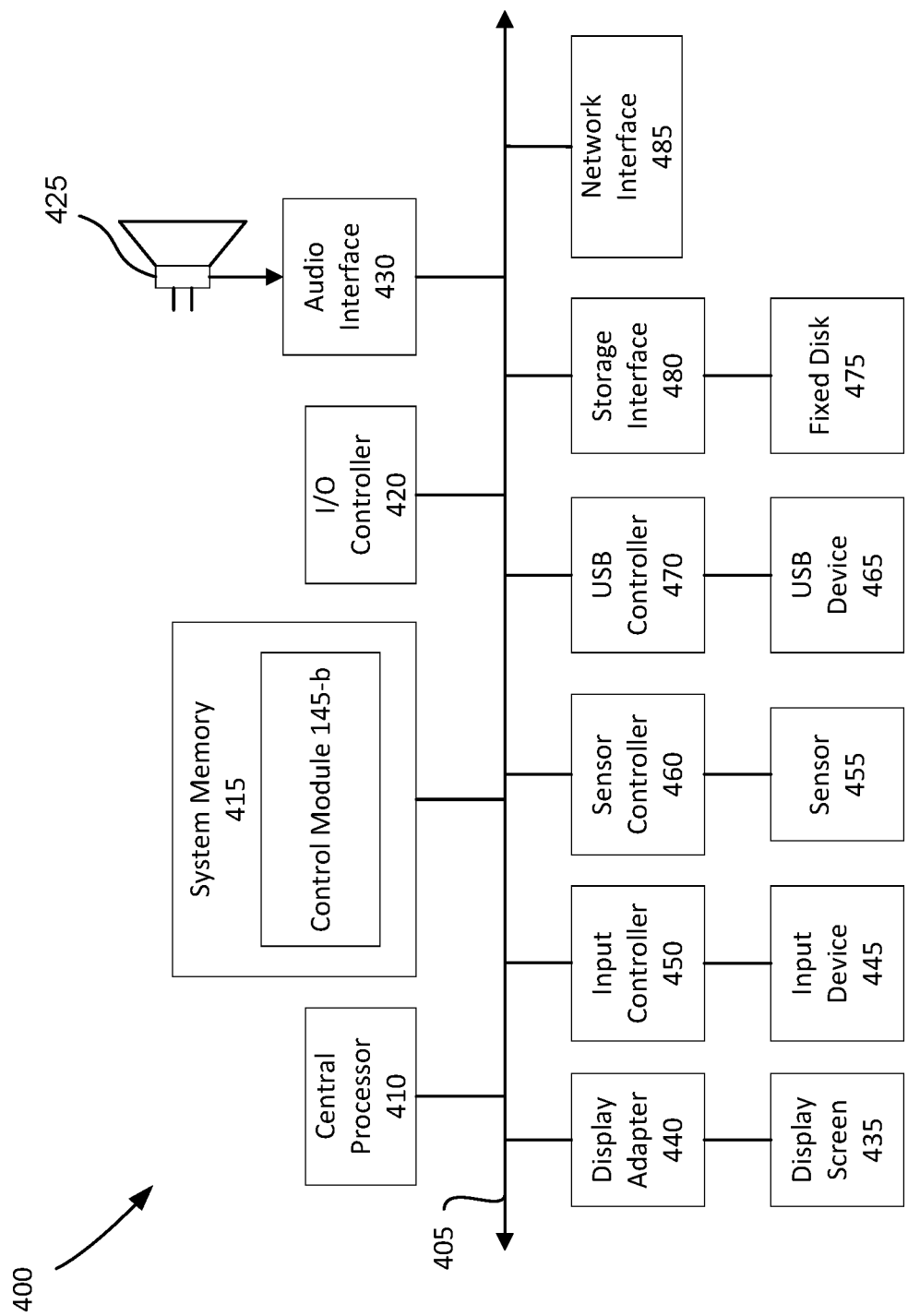
FIG. 4 depicts a block diagram of a computer system suitable for implementing the present systems and methods.

FIG. 4 depicts a block diagram of a computing device 400 suitable for implementing the present systems and methods. The device 400 may be an example of device 105 and/or computing device 150 illustrated in FIG. 1. In one configuration, device 400 includes a bus 405 which interconnects major subsystems of device 400, such as a central processor 410, a system memory 415 (typically RAM, but which may also include ROM, flash RAM, or the like), an input/output controller 420, an external audio device, such as a speaker system 425 via an audio output interface 430, an external device, such as a display screen 435 via display adapter 440, an input device 445 (e.g., remote control device interfaced with an input controller 450), multiple USB devices 465 (interfaced with a USB controller 470), and a storage interface 480. Also included are at least one sensor 455 connected to bus 405 through a sensor controller 460 and a network interface 485 (coupled directly to bus 405).

Bus 405 allows data communication between central processor 410 and system memory 415, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the control module 145-b to implement the present systems and methods may be stored within the system memory 415. Applications (e.g., application 140) resident with device 400 are generally stored on and accessed via a non-transitory computer readable medium and/or non-tangible computer readable medium, such as a hard disk drive (e.g., fixed disk 475) or other storage medium. Additionally, applications can be in the form of electronic signals modulated in accordance with the application and data communication technology when accessed via interface 485.

Storage interface 480, as with the other storage interfaces of device 400, can connect to a standard computer readable medium for storage and/or retrieval of information, such as a fixed disk drive 475. Fixed disk drive 475 may be a part of device 400 or may be separate and accessed through other interface systems. Network interface 485 may provide a direct connection to a remote server via a direct network link to the Internet via a POP (point of presence). Network interface 485 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to device 400 wirelessly via network interface 485.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 4 need not be present to practice the present systems and methods. The devices and subsystems can be interconnected in different ways from that shown in FIG. 4. The aspect of some operations of a system such as that shown in FIG. 4 are readily known in the art and are not discussed in detail in this application. Code to implement the present disclosure can be stored in a non-transitory computer-readable medium such as one or more of system memory 415 or fixed disk 475. The operating system provided on device 400 may be iOS®, ANDROID®, MS-DOS®, MS-WINDOWS®, OS/2®, UNIX®, LINUX®, or another known operating system.

Figure 5:
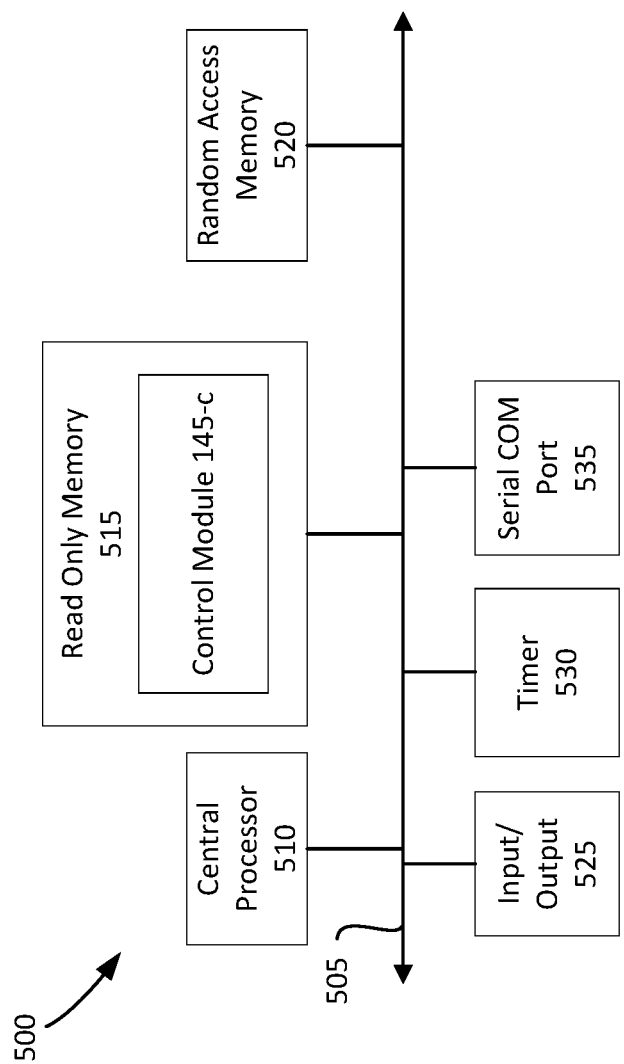
FIG. 5 depicts a block diagram of a microcontroller suitable for implementing the present systems and methods.

FIG. 5 depicts a block diagram of a computing device 500 suitable for implementing the present systems and methods.

The device 500 may be an example of device 105 and/or computing device 150 illustrated in FIG. 1. In some embodiments, the computing device 500 may be an example of a microcontroller. In one configuration, device 500 includes a bus 505 which interconnects major subsystems of device 500, such as a central processor 510, a read only memory 515, a random access memory 520, an input/output 525, a timer 530, and a serial COM port 535.

Bus 505 allows data communication between central processor 510 and read only memory (ROM) 515 and random access memory (RAM) 520. The RAM is generally the main memory into which the operating system and application programs are loaded. The ROM 515 or flash memory can contain, among other code, the Basic Input-Output system (BIOS) which controls basic hardware operation such as the interaction with peripheral components or devices. For example, the control module 145-c to implement the present systems and methods may be stored within the ROM 515. Applications (e.g., application 140) resident with device 500 are generally stored on ROM 515.

The input/out 525 may be software configurable to either an input or output state. For example the input/output 525 may function as an input state when programmed to read sensors or external signals. In other embodiments, when an input/output 540 is programmable for an export state, the input/output 252 may drive external devices such as LEDs, audio, etc. In some embodiments, the input/output 525 may include general purpose input/output pins.

The device 500 may include one or more timer 530. The timer may count down from a predetermined value to zero or may count up to a predetermined value. The timer 530 may send an interrupt signal to the central processor 510 to indicate it has finished counting. The device 500 may then take a predetermined action upon completion of the timer function. The serial com port 535 may function as a communication interface.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 5 need not be present to practice the present systems and methods. The devices and subsystems can be interconnected in different ways from that shown in FIG. 5. In some embodiments, the device 500 may be part of an Arduino, raspberry pi, or other programmable device. The aspect of some operations of a system such as that shown in FIG. 5 are readily known in the art and are not discussed in detail in this application. Code to implement the present disclosure can be stored in a non-transitory computer-readable medium such as one or more of ROM 515 or RAM 520.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The signals associated with system 400 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network interface 485 may enable one or more of WWAN (GSM, CDMA, and WCDMA), WLAN (including BLUETOOTH® and Wi-Fi), WMAN (Wi-MAX) for mobile communications, antennas for Wireless Personal Area Network (WPAN) applications (including RFID and UWB), etc.

The I/O controller 420 may operate in conjunction with network interface 485 and/or storage interface 480. The network interface 485 may enable system 400 with the ability to communicate with client devices (e.g., device 105 of FIG. 1), and/or other devices over the connection 115 of FIG. 1. Network interface 485 may provide wired and/or wireless network connections. In some cases, network interface 485 may include an Ethernet adapter or Fibre Channel adapter. Storage interface 480 may enable system 400 to access one or more data storage devices. The one or more data storage devices may include two or more data tiers each. The storage interface 480 may include one or more of an Ethernet adapter, a Fibre Channel adapter, Fibre Channel Protocol (FCP) adapter, a SCSI adapter, and iSCSI protocol adapter.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein. In further embodiments, the modules disclosed herein may operating using artificial intelligence (AI) and AI generated software.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

As used herein, the term "security action" may refer to any number of actions the systems described herein may take after determining that a file likely includes some type of malware. For example, types of security actions may include preventing the file from performing any actions on the computing device, alerting an administrator to the potential maliciousness of the file, quarantine the file, delete the file, block a download of the file, and/or warn a user about the file. In addition, the systems described herein may perform a security action on objects other than a file. For example, the systems described herein may blacklist malicious URLs and/or IP addresses. It should be appreciated that these are not exhaustive lists of the types of security actions which may be performed by the systems described herein. In some cases, security actions may involve interactions with systems that are controlled or influenced artificially. Other security actions are also included in this disclosure.

What is claimed is:

1. A programmable device configured for education and entertainment, comprising:
 a circuit board with a magnetic reed switch and a plurality of light emitting diodes (LEDs), the magnetic reed switch being configured to activate one or more modes of the programmable device, the LEDs being configured to display a pattern of light; and
 a polymer disk with a cylindrical receptacle to connect the circuit board to the polymer disk.

2. The programmable device of claim 1, the polymer disk being configured to enable a game mode of the programmable device.

3. The programmable device of claim 1, the polymer disk being configured to enable a mode of the programmable device.

4. The programmable device of claim 1, the LEDs being programmable by a user to display a user-defined pattern of light.

5. The programmable device of claim 1, the programmable device including one or more buttons configured to receive an input comprising a predetermined sequence of the one or more buttons enabling one or more modes of the programmable device, the programmable device including at least a game mode and a programming mode.

6. The programmable device of claim 1, the LEDs being configured to interact with a pair of diffraction glasses, the diffraction glasses being configured to reveal patterns of light emitted by the LEDs not viewable without the diffraction glasses.

7. The programmable device of claim 1, the magnetic reed switch being configured to interact with a wand, the wand being configured to enable one or more modes of the programmable device by waving the wand over the magnetic reed switch, the wand comprising a magnet or wireless transmitter to signal the wand's presence over the magnetic reed switch.

8. The programmable device of claim 1, the programmable device being configured to establish a connection between the programmable device and a user interface of a computing device, the connection comprising a wired connection or a wireless connection, the connection enabling a user to program the programmable device via the user interface.

9. The programmable device of claim 1, the programmable device including a musical encoder, the musical encoder being configured to encrypt data via one or more audible tones and to decrypt the data via a repetition of the one or more audible tones.

* * * * *